UNITED STATES PATENT OFFICE.

HERBERT C. WHITAKER, OF PHILADELPHIA, PENNSYLVANIA.

FOOD PROCESS AND PRODUCT.

1,182,517.  Specification of Letters Patent.  Patented May 9, 1916.

No Drawing.  Application filed May 27, 1915. Serial No. 30,802.

*To all whom it may concern:*

Be it known that I, HERBERT C. WHITAKER, a citizen of the United States, residing in Philadelphia, in the county of Philadelphia and State of Pennsylvania, have invented certain new and useful Improvements in Food Processes and Products, of which the following is a full, clear, and exact description of the invention, such as will enable others skilled in the art to which it appertains to make and use the same.

This invention relates to a new food and the process of making the food in which a suitable fruit is prepared by treating with pectin either having its natural flavor or being flavorless to produce a jelly, a marmalade or like substance.

In the manufacture of grape juice, wines, and other fruit juices, after the juice is expressed,—the pomace, which includes the skin, pulp, and seeds, gives a product, which hitherto has been wasted, never having been commercially utilized as a food product. My invention is not however limited to the utilization of pomace alone but to the grapes or other fruit which may be subjected to a greater or less degree of pressure than is ordinarily used in expressing the fruit juices. In fact, many hundreds of pounds of pomace are annually thrown away. This mass is treated with pectin which has its natural flavor or which is unflavored. Even after the juice has been expressed, the remaining mass, or pomace, contains valuable food material, consisting of flavors, fruit coloring matter, carbohydrates, organic acids and nitrogenous matters, which have not been utilized to a great extent in the manufacture of a food product.

I treat the pomace from the grape juice presses, wine presses and all the pomace remaining in the manufacture of jelly in such a manner that by mixing it with pectin, sucrose and water, a new and valuable food product is derived. Take the treatment of grapes for an example, but I do not necessarily limit myself to this fruit. After the grapes are washed, the skins broken to release the pulp and the seeds removed from the pulp, then the pulp and skins are subjected to pressure to express a portion of the juice, the percentage to be removed depending upon the ripeness and condition as well as the variety of grape used. The pulp together with the skins is then passed through a machine and cut into small pieces, or this may be done by hand or any well known suitable slicing device. I do not claim it to be essential to cut this pulp and skin; they may be used after seeds and portions of juice are removed, without further treatment. The product which is made by cutting or chopping the grapes, I call grape chops. This may be the entire grape or portion remaining after the juice has been expressed. If desirable, the grapes may be subjected to pressure without removing the seeds, or the seeds removed after the juice is expressed, or the seeds may be allowed to remain in the grape chops. When the water is sufficiently hot, the sugar is added, stirred until dissolved, the pectin and grape chops are added and the mixture boiled down until it assumes the consistency of a marmalade.

Instead of preparing the product as specified in the foregoing, the pectin, sucrose, grape chops and water may all be placed in a kettle or other container and then the heat applied and the boiling continued until the desired consistency is reached. Instead of sucrose or sucrose syrup, I may employ honey, glucose, cane-syrup, sorghum syrup, molasses, or any other saccharine substance; and in order to cheapen the product, other fruit may be added, or dried or canned fruits or vegetables may be added in proper amounts.

The pectin to be used may show a specific gravity of 1.012 at 70 degrees F. and may be free from the flavor of the fruit or vegetable from which it is derived. The result may however be accomplished by pectin, which has its inherent flavor. It may also be free or else contain the sugars occurring naturally in the fruits or vegetables from which it is derived. As an example, if one ton of grapes is placed in a kettle and subjected to pressure in order that a small amount of juice may be expressed, thus preventing burning when heat is applied; the juice is set free and the seeds are rendered more easily removable. After heating a sufficient time, from about one quarter of an hour to one hour, this mass of material is placed in fruit presses and subjected to pressure, which will express a percentage of the juice, depending upon the degree of pressure applied. The same result may be accomplished from a cold press. The material remaining behind is to be mixed with sufficient quantities of pectin sucrose and water and reduced to the consistency desired,—that usually reached in a marmalade. In some instances, it may be desirable to add small amounts of tartaric acid as a portion which naturally occurred in the fruit has been expressed with the juice. The quantity of tartaric acid to be added may be used in the preparation of the pectin, thereby rendering the pectin more easily obtainable from the fruit, yet not giving an undesirable property to the new valuable food product.

By the above recited process, a product is obtained which has a texture that cannot be obtained by using the grape itself in the preparation of the food product. Furthermore, by this process, a product is obtained which has the flavor modified to make it distinctive of this food product.

By this process, a product is obtained in which the crystallization of the tartaric acid in the finished food is prevented, thereby securing a food product which does not have this undesirable property,—that is, crystals of tartaric acid or cream of tartar and thereby obviously is more palatable and of greater commercial advantage.

Having thus described my invention,— what I claim as new and desire to secure by Letters Patent are:—

1. Unflavored pectin, treated with fruit pulp, sucrose and water.
2. A food product, consisting of grape, pectin and sucrose mixed together.
3. A food product consisting of grape, pectin and honey intermixed and cooked.
4. The process of producing a food resembling a marmalade which consists in taking grape pomace and adding pectin, sucrose and water and then boiling until the mass assumes the consistency of a marmalade.
5. The process of utilizing the by-product or pomace of the fruit juice extracting industries by taking said pomace and adding pectin, sucrose, and water substantially as described.
6. The process of taking heated water, adding sugar, then pectin and grape chops and then boiling until the mass assumes the consistency of a marmalade.
7. The process of mixing heated water, pectin, a sweetening substance and fruit pomace and then small quantities of tartaric acid and then boiling until the mass assumes the consistency of a marmalade.

In witness whereof, I hereby affix my signature.

HERBERT C. WHITAKER.